Aug. 9, 1966 W. C. SHATT 3,265,429
COMBINED PICK-UP DEVICE AND CANE
Filed May 13, 1964
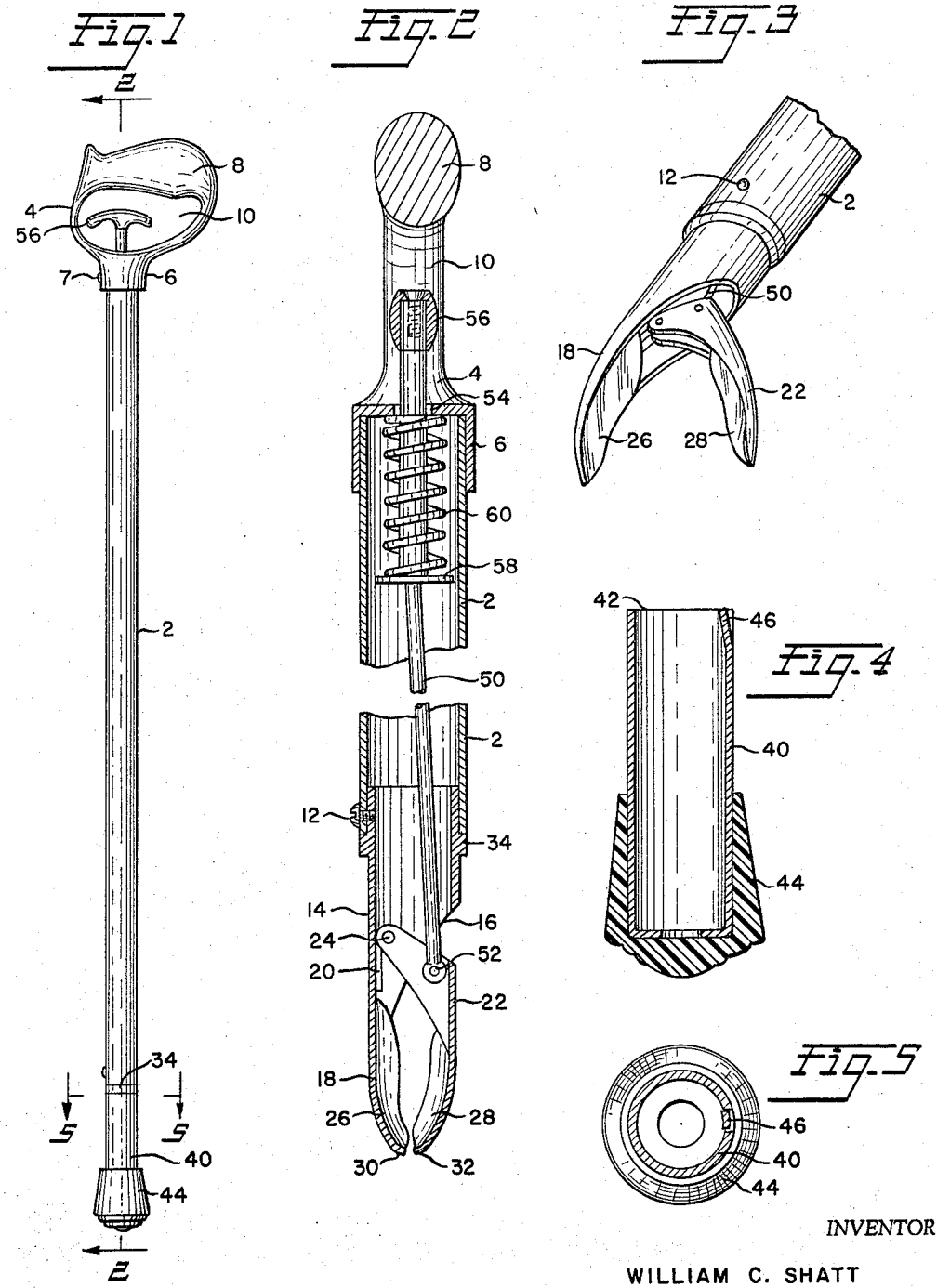
INVENTOR
WILLIAM C. SHATT
BY Scrivener, Parker, Scrivener + Clarke
ATTORNEYS

United States Patent Office 3,265,429
Patented August 9, 1966

3,265,429
COMBINED PICK-UP DEVICE AND CANE
William C. Shatt, 75 Maple Parkway, Sparta, N.J.
Filed May 13, 1964, Ser. No. 366,988
2 Claims. (Cl. 294—19)

This invention relates to and provides a novel and useful device in the form of a walking stick or cane which is to be carried in the usual manner and which may be changed quickly and easily into a device for picking up objects from the ground or elsewhere.

The device provided by the invention is described in the following specification and is illustrated in the accompanying drawings, in which:

FIG. 1 is a side elevational view of the cane pick-up device provided by the invention, being shown in this figure in its cane form;

FIG. 2 is a longitudinal cross-sectional view of the cane pick-up device taken on line 2—2 of FIG. 1;

FIG. 3 is a perspective view of the claw end of the cane pick-up device;

FIG. 4 is a longitudinal cross-sectional view of the sheath for the lower end of the cane pick-up device, and FIG. 5 is an end view of the sheath shown in FIG. 4.

The combined cane and pick-up device provided by the invention comprises an elongated hollow tube 2 which may be formed of aluminum or other suitable material and which is provided at its one end with a handle 4 having a socket part 6 which is adapted to receive the end part of the tube 2 and to be fastened thereto by a screw 7 which may be loosened to permit the handle to be rotated on the tube. The handle is preferably so constructed as to have a hand grip part 8 and a central opening 10 located between the hand grip and the socket 6 within which the fingers of the user are received.

At its other end of the tube 2 has positioned therein and attached thereto by screw 12 the upper end of a fixed claw member 14 which is formed of tubular material at and adjacent its upper end, and at its lower end is cut away as shown at 16 to provide a fixed claw which is arcuate in cross section. Intermediate its ends the fixed claw is provided with a hinge 20 positioned within the claw and to which there is pivotally attached a movable claw 22 which may be moved about the pivot 24 of hinge 20 from the closed position shown in FIG. 2, in which it is closely adjacent the fixed claw 14, to the open position shown in FIG. 3, in which it is removed from the fixed claw. The movable claw 22 has an arcuate cross sectional shape and the concave sides of the two claws face each other. The claws are of such size that their convex outer surfaces form a tube lying in the prolongation of the upper cylindrical part of the fixed claw 14 above the cut-away part 16. Within each of the two claw members there is attached a pad formed of rubber or other suitable soft material, these pads being shown at 26 and 28 in the fixed and movable claws respectively. The lower end of each of these pads terminates above the lowermost end edge part of its associated claw leaving protruding edges of the claws as shown at 30, 32. Adjacent its upper end the fixed claw is provided with an external annular flange 34 which engages the lower end of the tube 2 when the fixed claw is inserted into the tube.

Means are provided by the invention for closing and covering the claw end of the cane pick-up device in order to cause it to have the appearance, effect and function of a cane or walking stick. Such means comprise the sheath which is shown in FIGS. 4 and 5 and in place in FIG. 1, and which is a tubular member 40 which is open at one end and at its other end is closed by a usual rubber crutch tip 44. When it is desired that the device provided by the invention be used as a cane or walking stick the open end 42 of the sheath 40 is slipped over the claw end of the cane pick-up device until it meets the flange 34, thereby completely enclosing the claws. At its opens upper end 42 the wall of the sheath is struck inwardly to provide a narrow inwardly directed tang 46 which bears on the upper cylindrical end of the fixed claw 14 when the sheath is in place, thereby frictionally but removably attaching the sheath to the rest of the device.

Means are provided by the invention for normally maintaining the movable claw 22 in closed position and for operating it to open position in order to permit an article to be grasped in order to be picked up. Such means comprise an elongated rod 50 which is positioned within the tube 2 and extends longitudinally thereof. At its lower end this rod is pivotally connected to movable claw 22 outwardly of the pivotal connection 24 of the movable claw to the fixed claw. The upper end of rod 50 extends through an opening 54 in the socket part 6 of the handle 4 and terminates within the central opening 10 of the handle where it is provided with a knob 56 which may be grasped by the fingers of the user. Intermediate its ends and within the tube 2 the rod is provided with an abutment 58, and an extension spring 60 is positioned within the tube and bears at its ends on this abutment and on the end wall of socket 6 of the handle. This spring constantly urges the rod 50 downwardly to a position in which the movable claw 22 is in closed position adjacent the fixed claw.

When it is desired to use the device as a cane the sheath 40 is slipped over the claw end of the device giving the appearance of a cane, as shown in FIG. 1. If it is desired to pick up some articles the user merely grasps the knob 56 with his fingers and pulls it and rod 50 upwardly, thereby compressing the spring 60 and moving the movable claw about its pivot 24 to the open position shown in FIG. 3 so that the article may be received between the two claws, after which the knob 56 is released permitting the spring 60 to move the movable claw toward the fixed claw to grasp the article. Larger articles will be engaged by the pads 26 and 28 which are within the claws, while the uncovered lower edges of the claws may be used to pick up small articles in the same manner as the finger nails of the hand.

It will be observed from FIG. 2 that the movable claw opens transversely of the general plane of the handle and to the right hand side thereof, and this arrangement of parts is found to be most satisfactory for right handed people. For left handed people the screw 7 which attaches the handle to the tube may be loosened and the handle turned through 180° on the tube so that the movable claw opens to the left hand side of the handle.

While the embodiment of the invention shown and described is the preferred embodiment it will be apparent to those skilled in the art that the invention is susceptible of a variety of changes and modifications without, however, departing from the scope and spirit of the appended claims.

What is claimed is:

1. A combination cane and article pick-up device, comprising an elongated hollow tube, an open handle attached to one end of said tube, a first claw fixed to the other end of said tube and extending axially thereof, a second claw pivotally attached to the first claw member and movable into and out of article gripping relation to the first claw, an operating rod positioned within the hollow tube and extending longitudinally thereof and being connected at its one end to the second claw and at its other end being provided with an operating knob positioned within the open handle, and a spring engaging the operating rod within the hollow shaft and constantly urging the rod to a position in which the second claw is in article gripping relation to the first claw, from which position the second claw may be moved to open position by operation of the operating knob and the rod, the claw members being elongated axially of the hollow tube and having such external cross sectional shape that the claws when is closed position form a substantially cylindrical extension of the hollow tube.

2. A combination cane and article pick-up device, comprising an elongated hollow tube, an open handle attached to one end of said tube, a first claw fixed to the other end of said tube and extending axially thereof, a second claw pivotally attached to the first claw member and movable into and out of article gripping relation to the first claw, an operating rod positioned within the hollow tube and extending longitudinally thereof and being connected at its one end to the second claw and at its other end being provided with an operating knob positioned within the open handle, and a spring engaging the operating rod within the hollow shaft and constantly urging the rod to a position in which the second claw is in article gripping relation to the first claw, from which position the second claw may be moved to open position by operation of the operating knob and the rod, the claw members being elongated axially of the hollow tube and having such external cross sectional shape that the claws when is closed position form a substantially cylindrical extension of the hollow tube, and a cylindrical sheath fitting over the closed claws and the lower end of the hollow tube to cover the claws and provide a cane end.

References Cited by the Examiner

UNITED STATES PATENTS

| | | | |
|---|---|---|---|
| 465,222 | 12/1891 | Ulbricht | 294—19 |
| 1,245,924 | 11/1917 | Johnson | 294—104 X |
| 2,905,498 | 9/1959 | Lunde | 294—19 |
| 3,093,402 | 6/1963 | Sisson | 294—19 |

FOREIGN PATENTS 1,142,678  4/1957  France.

GERALD M. FORLENZA, *Primary Examiner.*

G. F. ABRAHAM, *Assistant Examiner.*